United States Patent Office 3,613,307
Patented Oct. 19, 1971

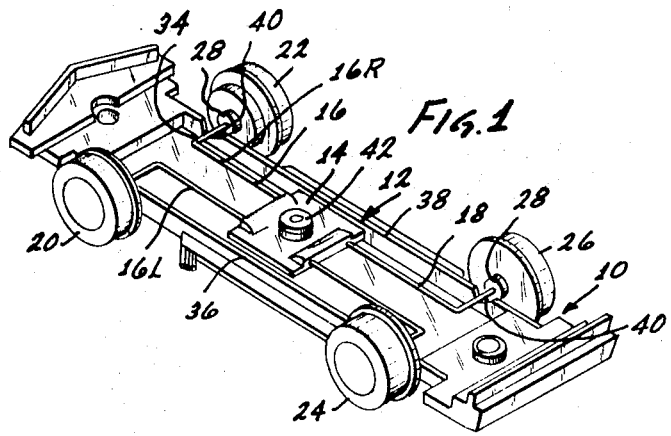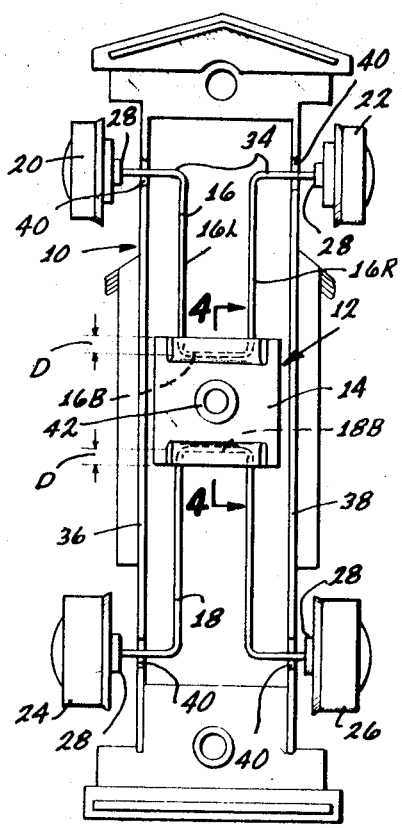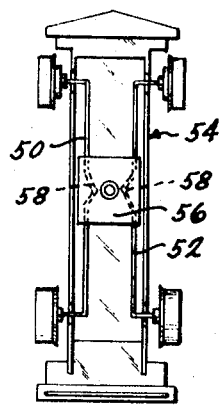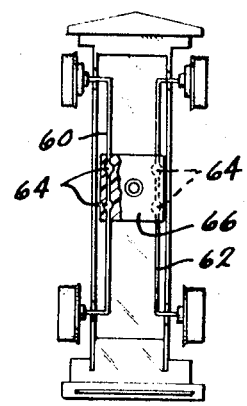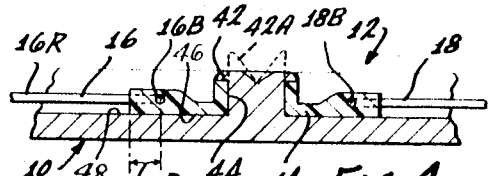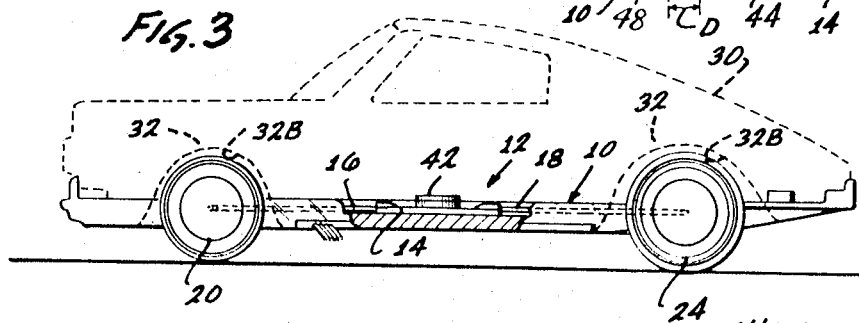
INVENTORS
WILLIAM R. BAYNES
STEPHEN H. KAMINSKI
BY Mark E. Shirk
ATTORNEY

3,613,307
INDEPENDENT SUSPENSION FOR TOY VEHICLES
William R. Baynes, Palos Verdes Peninsula, and Stephen H. Kaminski, Burbank, Calif., assignors to Mattel, Inc., Hawthorne, Calif.
Filed Oct. 16, 1969, Ser. No. 866,896
Int. Cl. A63h 17/26
U.S. Cl. 46—221
9 Claims

ABSTRACT OF THE DISCLOSURE

A toy vehicle in which the axle wires are molded into a mounting member that is attached to the vehicle frame. Each axle wire extends a substantial distance along the length of the vehicle between the mounting member and the wheel, to provide independent suspension of the wheels.

BACKGROUND OF THE INVENTION

(1) Field of the invention

This invention relates to toy vehicle apparatus and construction methods.

(2) Description of the prior art

Unpowered toy vehicles of the type which can race down an incline, can be made to run fast by providing very narrow diameter axles on which the wheels are rotatably mounted. Such axles cannot resist the downward force of a child who presses on the vehicle, so the vehicle must be constructed to allow considerable deflection of the outer ends of the axles without permanently deforming an axle. A simple, short, straight axle cannot be used because it cannot bend far enough without being bent past its elastic limit and therefore being permanently deformed. One way of preventing such damage is to attach simple axles to a long resilient member mounted on the vehicle frame, the resilient member taking up most of the bending so that the axles are not excessively bent. However, the pair of wheels at each end of the vehicle then tend to deflect together, reducing independence of suspension and thereby reducing performance of the vehicle. Another method of mounting the wheels is to employ a long axle wire whose center portion extends in a U shape, and to provide several pins on the vehicle frame that hold the axle in a greatly deflected configuration to keep it firmly in position on the frame. However, the mountings are relatively complicated, necessitating substantial time and effort for mounting the axles and increasing the chance of improper operation either initially or after moderate abuse by a child.

OBJECTS AND SUMMARY OF THE INVENTION

An object of the present invention is to provide a wheel suspension for toy vehicles which is simple, rugged and of low cost, and which provides for independent suspension of the wheels.

Another object is to provide a low cost, high performance toy vehicle.

In accordance with the present invention, a toy vehicle is provided which allows low cost manufacture of a rugged and fast moving vehicle with independent suspension of the wheels. A wheel unit is employed which includes a pair of axles molded or otherwise fastened to a mounting member, so that the wheel unit can be installed on a vehicle frame by merely attaching the mounting member to the frame. In one embodiment of the invention, each axle has a U-shaped center portion, with the base of the U held by the mounting member and the legs of the U extending along the length of the vehicle. The long, free length at each of the axle allows substantial wheel deflection to be taken up entirely by one end of the axle wire, without substantially deflecting the mounting member or the opposite end of the axle, so that the wheels are independently suspended.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a toy vehicle chassis constructed in accordance with the invention;

FIG. 2 is a plan view of the chassis of FIG. 1;

FIG. 3 is a side elevation view of the chassis of FIG. 1;

FIG. 4 is an enlarged sectional side view of a portion of the chassis of FIG. 1;

FIG. 5 is a plan view of a chassis constructed in accordance with another embodiment of the invention; and FIG. 6 is a plan view of a chassis constructed in accordance with still another embodiment of the invention.

DESCRIPTION OF THE PREFERRED EMBODIMENTS

FIG. 1 illustrates a toy vehicle chassis constructed in accordance with the invention comprising an elongated frame 10 which can support a body representing an automobile. A wheel assembly 12 which is mounted on the frame, includes a mounting member 14, a pair of axles 16, 18 and four wheels 20, 22, 24 and 26 rotatably mounted on the axles. The vehicle is unpowered, although the invention can be applied to motor driven vehicles.

The chassis is designed to permit high speed and long distance travel when the vehicle is accelerated by initially running down an incline or by other means. In order to reduce friction to a minimum to allow long, high speed travel, the axles 16, 18 are constructed of narrow diameter wire, such as wires on the order of 0.020 inch diameter for a vehicle which is about three inches long, and the wheels have bearings 28 of low friction material such as Teflon. Care must also be taken that the four wheels are aligned to run straight ahead, so that there is a minimum of friction loss caused by misalignment. In addition, the bottom of all four wheels should lie at close to the same level so the vehicle is supported on all four wheels and is therefore stable. It is also desirable that the wheels be allowed to deflect independently of each other, so that when one wheel hits a bump in the road, it can deflect over the bump without causing one end of the chassis, or even the other wheel at the same end of the chassis, to deflect. Such independent suspension helps keep the vehicle on the track when it traverses a bad track section.

The narrow diameter axles 16, 18 are not strong enough to support the force with which a child may press down on the vehicle in normal play. Accordingly, the body 30, shown in phantom lines in FIG. 3, which is fastened to the chassis, is designed so that the bottom surfaces or fender wells 32B of the fenders 32 "bottom" on the wheels after a small downward deflection of the body, before the axle wires have been deflected beyond their elastic limit. While the fenders limit the amount of axle bending, sufficient bending can still occur which would cause a permanent set in the axle wire if each axle were a short, straight piece of wire whose center was fixed to the vehicle frame. Thus, special provisions must be made to allow substantial wheel deflection without permanently setting the axle wire.

Each axle wire 16, 18 has a center portion of substantially U shape. Thus, for example, axle 16 has a U-shaped center portion that includes a right leg 16R, left leg 16L, and base 16B. The base 16B is rigidly held by the mounting member 14, but each leg is free to twist and deflect along the region forward of where it is held by the mounting member. The mounting member engages not only the base, such as base 16B, but also portions of the legs along a distance D immediately forward and rearward of the base. The distance D is small, preferably less than a majority of the lengthwise extension of the axles, so that a substantial length of the axles are free to twist and deflect.

If wheel 22 is deflected upwardly, only a fraction of the deflection is taken up by bending of the laterally extending end 34 of the axle, most of the deflection being taken up by twist and upward deflection of the right leg 16R of the axle. Thus, the opposite portions of the axle 16 each serve as a separate axle means, each axle means having an inner portion molded into the mounting member 14, a leg 16L or 16R extending with a directional component primarily along the length of the frame, and an outer end on which a wheel is mounted. The long combined free length of the axle means, such as the axle portion 16R and laterally extending end 34, enables substantial deflection of the wheel without bending of the axle past its elastic limit. Furthermore, no substantial bending or twisting of the mounting member 14 occurs, so that almost none of the deflection of wheel 22 is transmitted to the chassis, or even to the other wheel 20 on the same axle. Accordingly, small deflections of wheel 22 are largely isolated from the rest of the vehicle, and the vehicle can run more smoothly over a poor road. It is not necessary that the legs, such as 16L and 16R extend parallel to each other, but they must extend with a substantial directional component parallel to the length of the frame, and preferably with a directional component primarily parallel to the length of the frame.

The wheel unit 12 may be constructed by bending each of two axle wires to form a long, narrow U at the center of each. The base portions 16B and 18B of the axle wires and regions immediately forward and rearward of these two base portions, must then be captured firmly by the mounting member. To do this, a jig is provided that can hold two axle wires 16 and 18 so that the base portions 16B and 18B extend through a lower die of a mold that defines the mounting member 14. An upper die of the mounting member is then lowered to close the mold, and a material such as a tough plastic is injected into the mold cavity. When the molded material has cooled, the assembly, which includes a pair of axle wires molded into a mounting member, is removed from the mold and jig. Four wheels may be mounted on the ends of the axle wires, either before the axle wires are molded into the mounting member or afterwards, to form the wheel unit.

After the wheel unit is constructed, it can be installed on a chassis frame 10 and a body 30 can then be attached to the chassis to complete the vehicle. The chassis frame may include a pair of side rails 36, 38 with four slots 40, for receiving the outer ends of the axle wires. A stud 42 at the center of the frame, which is originally in a configuration shown at 42A, is provided to hold the mounting member. The wheel unit 12 is installed by laying it on the frame 10 so that a central hole 44 in the mounting member receives the stud 42A, while the outer ends of the axles lie in the slots 40 in the side rails of the frame. The stud 42A is then upset to the configuration shown at 42 to securely hold down the mounting member 14. The body 30 of the vehicle can then be installed on the frame to complete the vehicle.

Accurate alignment of all four wheels is established by accurate bending of the axle wires 16, 18 and by accurately holding them in place in the jig when the molding member 14 is formed around their base portions 16B, 18B and around a small region of the legs near the base portions. High accuracy can be maintained in these operations, so that good alignment of the wheels can be easily maintained. Accurate mounting of the mounting member on the frame 10 is not as easily accomplished. However, the mounting member has a flat lower surface 46 which lies on a flat region 48 of the frame around the stud, so that the plane of the mounting member is accurately established even if there is a slight uncertainty as to its rotational position around the stud. Generally, the wheel unit is formed so that the outer ends of the axles do not bear against the walls of the slot 40 in the side rails of the frame. It is possible to form the wheel unit so that the axles 16 and 18 extend at a slight downward angle from the mounting member 14, so that the ends of the axles bear against the walls of the slot 40 at the bottom of the slot, to preload the wheels. In any case, all portions of the axles not in contact with the mounting member 14 are free of restraints against upward deflection with respect to the frame.

Thus, the invention provides a wheel unit that includes a pair of axles with wheels at their ends, the axles being held in a precise relationship with respect to each other to assure accurate wheel alignment. The wheel unit is constructed apart from the rest of the chassis, and can be installed on the chassis frame by merely fastening the mounting member to the frame. In addition to providing complete wheel units that enable precise alignment and low cost assembly, the invention allows for independent wheel suspension to maximize performance of the vehicle. The small size of the mounting member 14 reduces the amount of material required, to further lower the cost, and results in a lighter vehicle.

FIG. 5 illustrates another embodiment of the invention wherein each of two members 50, 52 extend between opposite end portions of the frame 54, through a mounting member 56. Each axle member has a center portion 58 within the mounting member 56, which is out of alignment with the portions of the axle members forward and rearward of the mounting member. These non-aligned portions resist rotation of the axle members with respect to the mounting member.

FIG. 6 illustrates yet another embodiment of the invention, similar to that of FIG. 5, but wherein each of two axle members 60, 62 has a pair of flattened regions 64 within the mounting member 66. The flattened regions 64 resist rotation of the axle members with respect to the mounting member without requiring bending of the center portions of the axle members.

While the holding members illustrated and described above are integral members molded around the centers of the axle members, it is possible to use a two piece holding member that captures the base portions of the axles without being molded around them. In such a case, the centers of the axle members can be laid on a first half of a holding member, and the other half of the holding member then can be laid over the first half and fastened thereto, to capture the axles between them. Molding the holding member around the axle members is preferable, however, because it is generally cheaper and provides a more rugged assembly.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A toy vehicle comprising:
    a frame having a length and width;
    a mounting member fastened to said frame;
    a pair of axles formed by a wire extending between opposite end portions of said frame through said mounting member, said wire having at least one flattened portion within said mounting member to prevent rotation of said wire, each axle including a leg extending with a directional component primarily along the length of said frame, and an outer end; and a plurality of wheels, each rotatably mounted to the outer end of said axles.

2. A toy vehicle comprising:

a frame having a length and a width, said frame also having an upper surface with a flat region near the center thereof;

a mounting member fastened to said frame, said mounting member having a flat lower region for disposal against said flat frame region to largely establish the orientation of said mounting member relative to said frame;

a plurality of axles, each having an inner portion molded into said mounting members, a leg extending with a directional component primarily along the length of said frame, and an outer end;

the portions of said axles not in contact with said mounting member are free of upward restraint relative to said frame; and a plurality of wheels, each rotatably mounted on the outer end of one of said axles.

3. A toy vehicle comprising:

a vehicle frame having a width and length;

a pair of axle wires, each having a pair of laterally extending ends and a substantially U-shaped center portion, with the legs of each U extending in a direction primarily along and substantially parallel to the length of the frame;

a mounting member fixed to the base portions of said substantially U-shaped center portions and to only the regions of said legs immediately adjacent to each of said base portions; and means for mounting said mounting member on said frame.

4. The toy vehicle described in claim 3 wherein:

said mounting member is molded around said base portion and said regions of said legs immediately adjacent to said base portions.

5. The toy vehicle described in claim 3 wherein:

the portions of said axle wires which are not in contact with said mounting member are free of upward restraints relative to said frame.

6. A toy vehicle comprising:

a frame having forward and rearward ends;

a pair of axle members, each extending between opposite end portions of said frame along one side of said frame, and each having a pair of laterally extending ends;

a mounting member fixed to the center portions of said axle members; and means for mounting said mounting member on said frame;

the portions of said axle members forward and rearward of said mounting member being free of upward restraints relative to said frame.

7. The toy vehicle described in claim 6 wherein:

each of said axle members has a center portion within said mounting member which is out of alignment with the portions of said axle members forward and rearward of said mounting member.

8. The toy vehicle described in claim 6 wherein:

said center portions of said axle members are molded into said mounting member.

9. The toy vehicle described in claim 6 wherein:

each of said axle members has a flattened portion within said mounting member.

References Cited

UNITED STATES PATENTS

| | | | |
|---|---|---|---|
| 2,552,824 | 5/1951 | Thurman | 46—221 |
| 2,821,808 | 2/1958 | Rosato | 46—221 X |
| 2,833,082 | 5/1958 | Carson | 46—221 X |
| 3,280,500 | 10/1966 | Fairbairn | 46—201 |
| 3,484,986 | 12/1969 | La Branche et al. | 46—201 |

LOUIS G. MANCENE, Primary Examiner

R. F. CUTTING, Assistant Examiner